United States Patent
Cooper et al.

(10) Patent No.: US 8,880,339 B1
(45) Date of Patent: Nov. 4, 2014

(54) SCHEMATIC DISPLAY FOR VERTICAL NAVIGATION

(75) Inventors: Seth A. Cooper, Marion, IA (US); David A. Gribble, Cedar Rapids, IA (US); David L. Leedom, Center Point, IA (US); Geoffrey A. Shapiro, Cedar Rapids, IA (US); Daniel E. Russell, Marion, IA (US); James E. Winfield, Marion, IA (US)

(73) Assignee: Rockwell Collins Inc., Cedar Rapids, IA (US)

( * ) Notice: Subject to any disclaimer, the term of this patent is extended or adjusted under 35 U.S.C. 154(b) by 81 days.

(21) Appl. No.: 13/590,688

(22) Filed: Aug. 21, 2012

(51) Int. Cl.
*G01C 23/00* (2006.01)
*G08B 23/00* (2006.01)
*G08G 5/00* (2006.01)
*G08G 5/02* (2006.01)
*G08G 5/04* (2006.01)
*G08G 5/06* (2006.01)

(52) U.S. Cl.
CPC .............. *G01C 23/00* (2013.01); *G01C 23/005* (2013.01)
USPC ............ 701/440; 701/3; 701/4; 701/5; 701/8; 701/9; 701/11; 701/16; 701/18; 701/400; 701/411; 701/412; 701/413; 340/945; 340/947; 340/951; 340/953; 340/961; 340/969; 340/971; 340/972; 340/980

(58) Field of Classification Search
CPC .............. B64D 45/0045; G01C 212/36; G01C 21/3626; G01C 21/3629; G01C 23/00; G01C 23/005; G08G 5/0013; G08G 5/0021; G08G 5/003; G08G 5/0034; G08G 5/0039
USPC .......................... 701/3–5, 8–9, 11, 16, 18, 400, 701/411–413, 440; 340/945, 947, 951, 953, 340/961, 969, 971–972, 980
See application file for complete search history.

(56) References Cited

U.S. PATENT DOCUMENTS

| | | | |
|---|---|---|---|
| 7,693,621 B1* | 4/2010 | Chamas | 701/16 |
| 8,234,058 B1* | 7/2012 | Barber et al. | 701/120 |
| 2003/0023354 A1* | 1/2003 | Brust et al. | 701/3 |
| 2003/0132860 A1* | 7/2003 | Feyereisen et al. | 340/973 |
| 2004/0059474 A1* | 3/2004 | Boorman et al. | 701/14 |
| 2007/0164877 A1* | 7/2007 | Mumaw et al. | 340/973 |
| 2007/0219678 A1* | 9/2007 | Coulmeau | 701/3 |
| 2007/0219679 A1* | 9/2007 | Coulmeau | 701/3 |
| 2009/0043434 A1* | 2/2009 | Deker | 701/16 |
| 2009/0150012 A1* | 6/2009 | Agam et al. | 701/3 |
| 2009/0319100 A1* | 12/2009 | Kale et al. | 701/4 |
| 2010/0026525 A1* | 2/2010 | Feyereisen et al. | 340/972 |
| 2010/0131126 A1* | 5/2010 | He et al. | 701/14 |

* cited by examiner

*Primary Examiner* — Mary Cheung
*Assistant Examiner* — Atul Trivedi
(74) *Attorney, Agent, or Firm* — Donna P. Suchy; Daniel M. Barbieri

(57) ABSTRACT

A schematic display for presenting vertical navigation (VNAV) data is disclosed. A planned route such as a flight plan is divided into a series of VNAV legs, and only a VNAV schematic that corresponds to the active VNAV leg is displayed. The VNAV schematic in accordance with the present disclosure is a profile-view schematic for the active VNAV leg, providing a visual representation indicating the locations of the upcoming Top of Climb (TOC) or Top of Descent (TOD). Additional VNAV data may also be presented to provide content context. Since the schematic display in accordance with the present disclosure only displays VNAV data relevant to the active VNAV leg at a given time, the complexities associated with displaying the VNAV schematic is reduced, making the VNAV data easy to read and understand.

20 Claims, 6 Drawing Sheets

SCHEMATIC DISPLAY FOR VERTICAL NAVIGATION

TECHNICAL FIELD

The present disclosure relates generally to display systems, and more particularly to display systems for vertical navigation.

BACKGROUND

Modern Flight Management Systems (FMS) include comprehensive aircraft navigation and performance estimation functions. These functions enable performance based navigation operations with a high degree of accuracy. However, current functions are very complex, and have a steep learning curve for flight crews. One of the most common areas of difficulty involves Vertical Navigation (VNAV).

VNAV provides the ability of predicting aircraft performance during various climbs and descents while providing vertical guidance relative to a flight plan. In addition, VNAV also provides guidance commands to the flight control system, and as a result will automatically initiate aircraft movements. This results in the flight crews needing to be aware of what VNAV is planning on doing next so that they are prepared for impending aircraft movements. Current systems use multiple display pages (such as route windows, legs pages, VNAV thrust pages and vertical situation display) mixed into the flight plan data to describe the systems operation to the flight crew. Such systems are difficult to read and understand, and have presented training challenges because of the complexities associated with VNAV.

Therein lies a need for a schematic display for presenting vertical navigation data without the aforementioned shortcomings.

SUMMARY

The present disclosure is directed to a method for presenting vertical navigation (VNAV) data on an aircraft. The method may include: dividing a flight plan into a series of VNAV legs, each VNAV leg of the series of VNAV legs including one of: a top of climb (TOO) vertical waypoint or a top of descent (TOD) vertical waypoint; generating a series of profile-view schematics, each profile-view schematic of the series of profile-view schematics corresponding to one VNAV leg of the series of VNAV legs; identifying an active VNAV leg among the series of VNAV legs based on a location of the aircraft with respect to the series of VNAV legs; and displaying an active profile-view schematic that corresponds to the active VNAV leg.

Another embodiment of the present disclosure is directed to a method for presenting VNAV data on a vehicle. The method may include: dividing a planned route into a series of VNAV legs, each VNAV leg of the series of VNAV legs including at least one of: a top of climb (TOO) vertical waypoint or a top of descent (TOD) vertical waypoint; generating a series of profile-view schematics, each profile-view schematic of the series of profile-view schematics corresponding to one VNAV leg of the series of VNAV legs; identifying an active VNAV leg among the series of VNAV legs based on a location of the vehicle with respect to the series of VNAV legs; and displaying an active profile-view schematic that corresponds to the active VNAV leg.

A further embodiment of the present disclosure is directed to a computer-readable medium having computer-executable instructions for performing a method for presenting VNAV data on a vehicle. The method may include: dividing a planned route into a series of VNAV legs, each VNAV leg of the series of VNAV legs including at least one of: a top of climb (TOO) vertical waypoint or a top of descent (TOD) vertical waypoint; generating a series of profile-view schematics, each profile-view schematic of the series of profile-view schematics corresponding to one VNAV leg of the series of VNAV legs; identifying an active VNAV leg among the series of VNAV legs based on a location of the vehicle with respect to the series of VNAV legs; and displaying an active profile-view schematic that corresponds to the active VNAV leg.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

The present disclosure provides a schematic display for presenting vertical navigation (VNAV) data. The flight plan is divided into a series of VNAV legs, and a VNAV schematic that corresponds to the active VNAV leg is displayed. The VNAV schematic in accordance with the present disclosure is a profile-view schematic for the active VNAV leg, providing a visual representation indicating the locations of the upcoming Top of Climb (TOC) or Top of Descent (TOD). Additional VNAV data may also be presented to provide content context. Since the schematic display in accordance with the present disclosure only displays VNAV data relevant to the active VNAV leg at a given time, the complexities associated with displaying the VNAV schematic is reduced, making the VNAV data easy to read and understand.

Flight management systems generally describe proposed aircraft flights in flight plans. In accordance with the present disclosure, a flight plan/route is divided into a series of VNAV legs. In one particular implementation, each VNAV leg may include one TOC vertical waypoint or one TOD vertical waypoint. That is, each VNAV leg is associated with either a climb or a descent event specified in the flight plan. Such associations limit the amount of data to be displayed for each VNAV leg, allowing the data to be presented in a manner that is easier for the user to read and understand.

In accordance with the present disclosure, a profile-view schematic is generated for each one of the series of VNAV legs. In one particular implementation, each profile-view schematic is a graphical representation of a particular VNAV leg. Each profile-view schematic may indicate the next vertical waypoint in the flight plan and provide a visual indication to describe whether the upcoming event is a climb or a descent event. It is contemplated that such a visual indication may or may not be drawn to scale. Furthermore, certain implementations may allow the profile-view schematics to be dynamically updated, as will be described later in the present disclosure.

Figure 1:
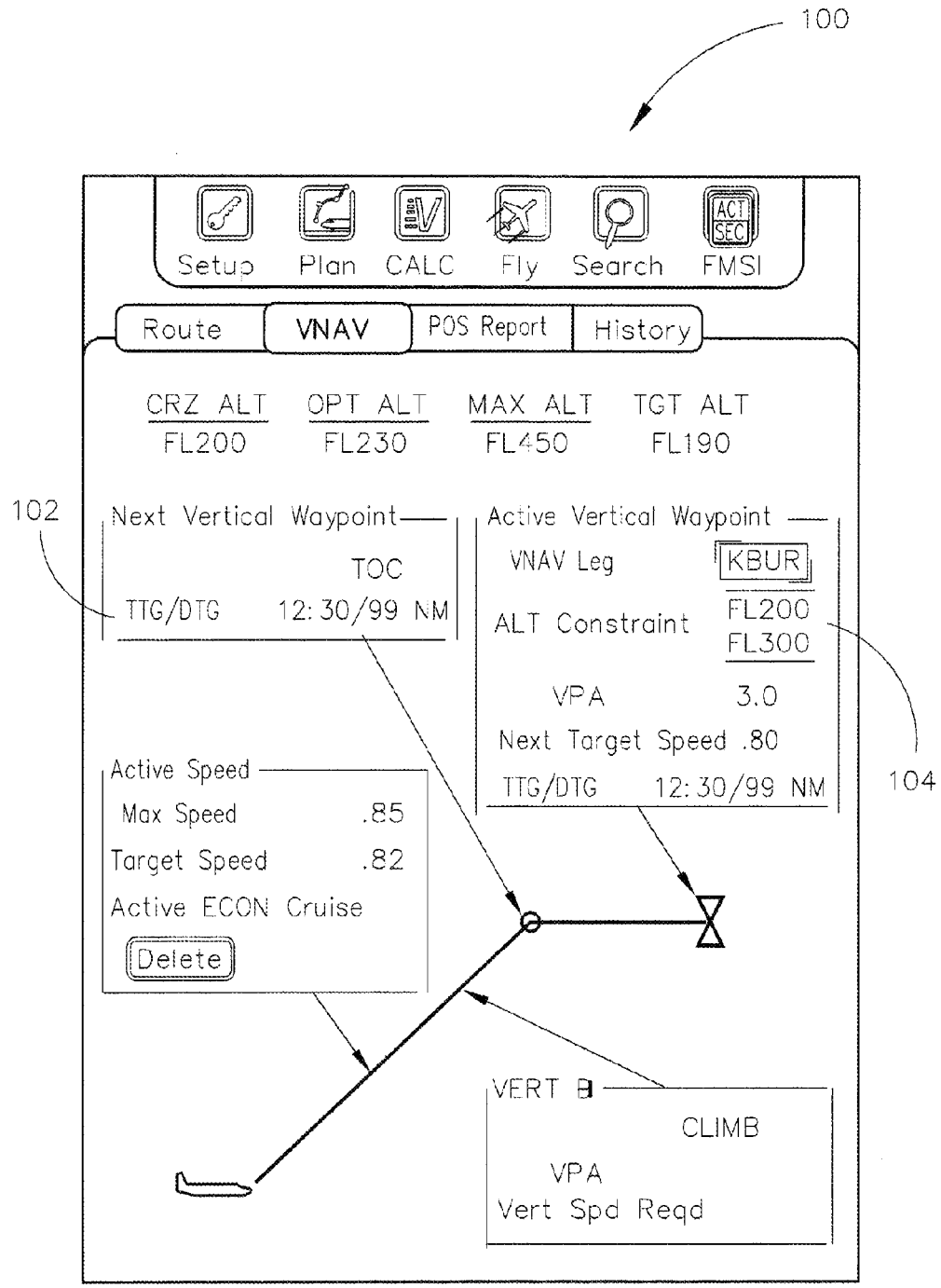
FIG. 1 is an illustration depicting a profile-view schematic of a vertical navigation (VNAV) leg.
Figure 2:
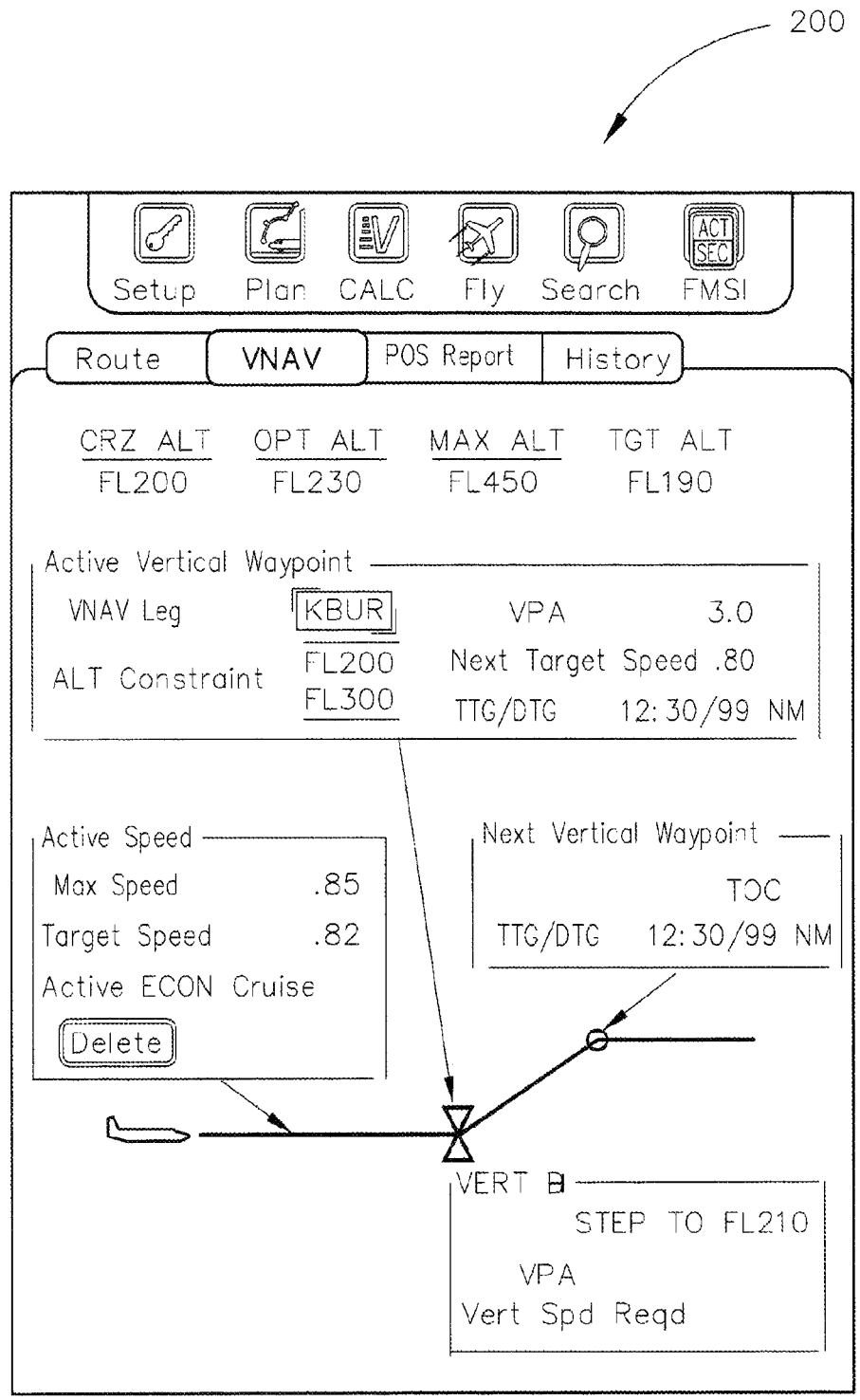
FIG. 2 is an illustration depicting a profile-view schematic of another VNAV leg.

Referring to FIGS. 1 through 5, illustrations depicting various profile-view schematics are shown. Based on the location of the aircraft with respect to the series of VNAV legs, an active VNAV leg may be identified. The profile-view schematic that corresponds to the active VNAV leg may then be selected and displayed. For example, suppose the aircraft is about to take-off, thus the first VNAV leg of the series of VNAV legs may be identified as the active VNAV leg. The profile-view schematic of the first VNAV leg may therefore be displayed to indicate the position of the next vertical waypoint. FIG. 1 depicts an exemplary profile-view schematic 100. TOC 102 is indicated as the next vertical waypoint which the aircraft is required to climb to after departure.

It is contemplated that text descriptions of the vertical navigation data relevant to the active VNAV leg may also be displayed along the profile-view schematic. For instance, speed and/or timing constraints enroute to TOC 102 may be presented in text format as illustrated in the figures. It is noted that only data relevant to the active VNAV leg is displayed. Displaying data in this manner provides direct visual association between the constraints and the active VNAV leg and also limits the amount of data that needs to be displayed at a given time.

Figure 3:
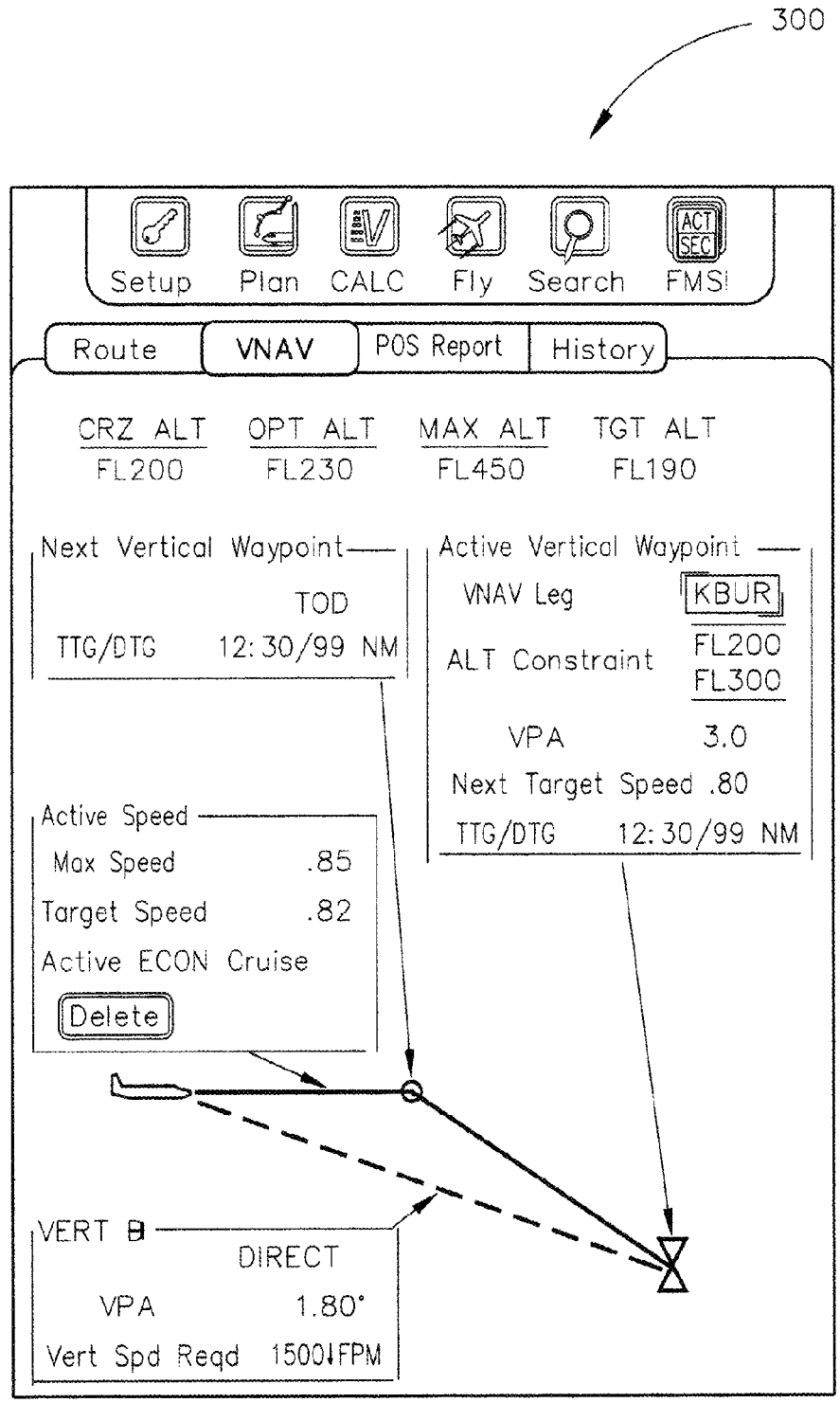
FIG. 3 is an illustration depicting a profile-view schematic of another VNAV leg.

It is also contemplated that the profile-view schematic may be updated when the aircraft enters the next VNAV leg. For example, suppose the aircraft completes the first VNAV leg as depicted in FIG. 1, and is now entering the second VNAV leg. The second VNAV leg may require the aircraft to step from one flight level altitude to another, as the profile-view schematic 200 indicates. Similarly, suppose the aircraft completes the second VNAV leg and is subsequently required to descend from the current flight level altitude to the surface level (e.g., for landing) in the next VNAV leg, the profile-view schematic 300 may be displayed as shown in FIG. 3.

It is understood, however, that the profile-view schematics described above are merely exemplary. Different flight plans produce different VNAV legs, and the profile-view schematics associated with such VNAV legs may vary without departing from the spirit and scope of the present disclosure.

It is contemplated that alternative paths may be available for certain VNAV legs. For example, as shown in FIG. 3, while the aircraft may start to descend after reaching the next vertical waypoint (TOD) according to one path, an alternative path may be to descend as soon as the aircraft enters this VNAV leg. Therefore, in situations where more than one path is available for a particular VNAV leg, the profile-view schematic associated with this particular VNAV leg may present any or all of such paths to the user. It is understood that various visual indicators (e.g., different coloring, shading or the like) may be utilized to distinguish the alternative paths when more than two or more paths are displayed simultaneously.

Figure 4:
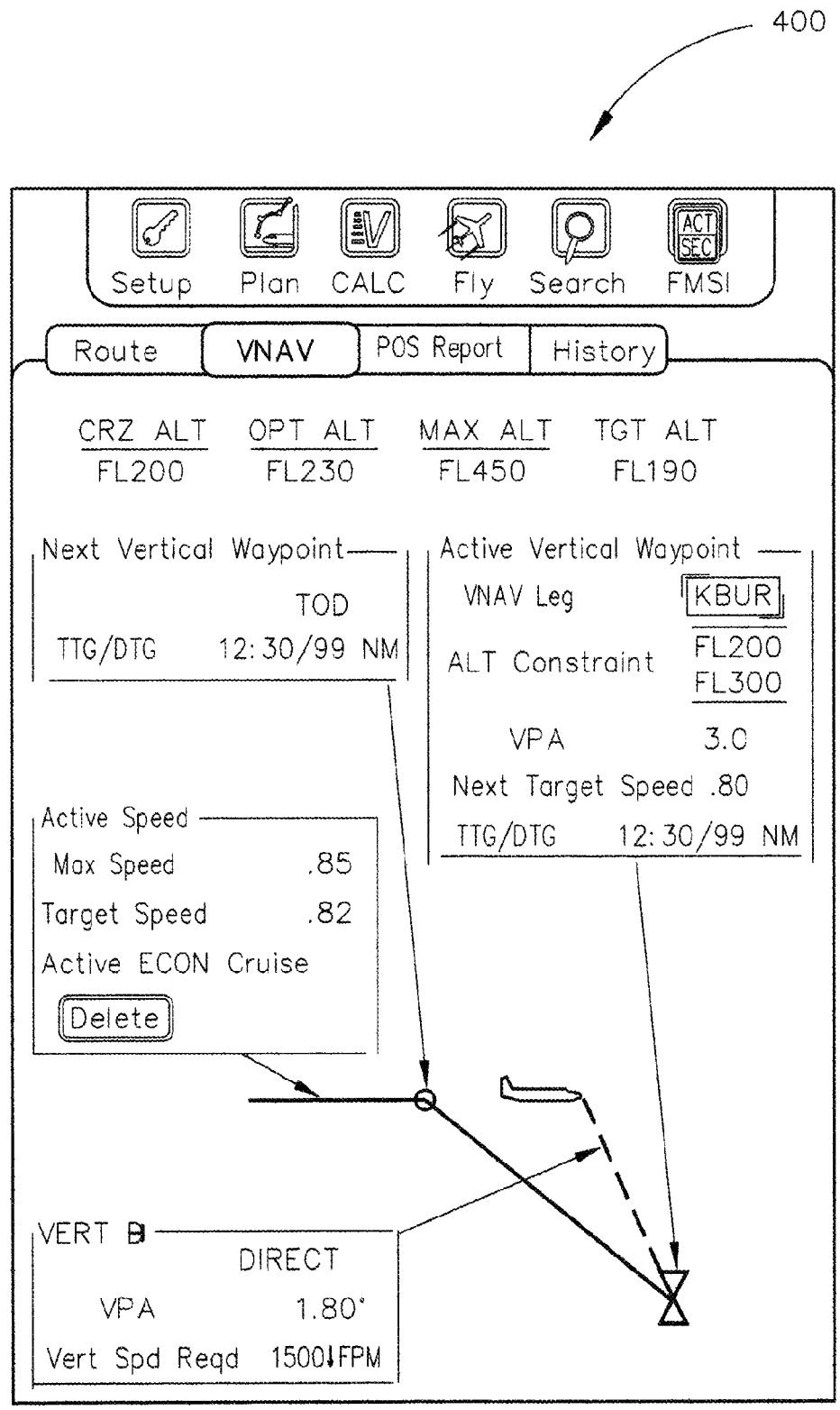
FIG. 4 is an illustration depicting a profile-view schematic of another VNAV leg.

It is also contemplated that the profile-view schematic of a particular VNAV leg may provide a signal/warning when certain conditions are detected. For example, suppose the aircraft is required to start to descend after reaching the TOD as depicted in FIG. 3, and suppose it is determined (e.g., via positioning systems) that the aircraft has traveled past the TOD without initiating the descent, a visual signal as depicted in FIG. 4 may be provided to indicate that such a condition has occurred. It is understood that the location of the aircraft with respect to the profile-view schematic may or may not need to be drawn to scale. In another example, suppose the aircraft has climbed past a TOC and is still climbing, a visual signal may also be provided to indicate that such a condition has occurred. Similarly, the location of the aircraft with respect to the profile-view schematic may or may not need to be drawn to scale.

Figure 5:
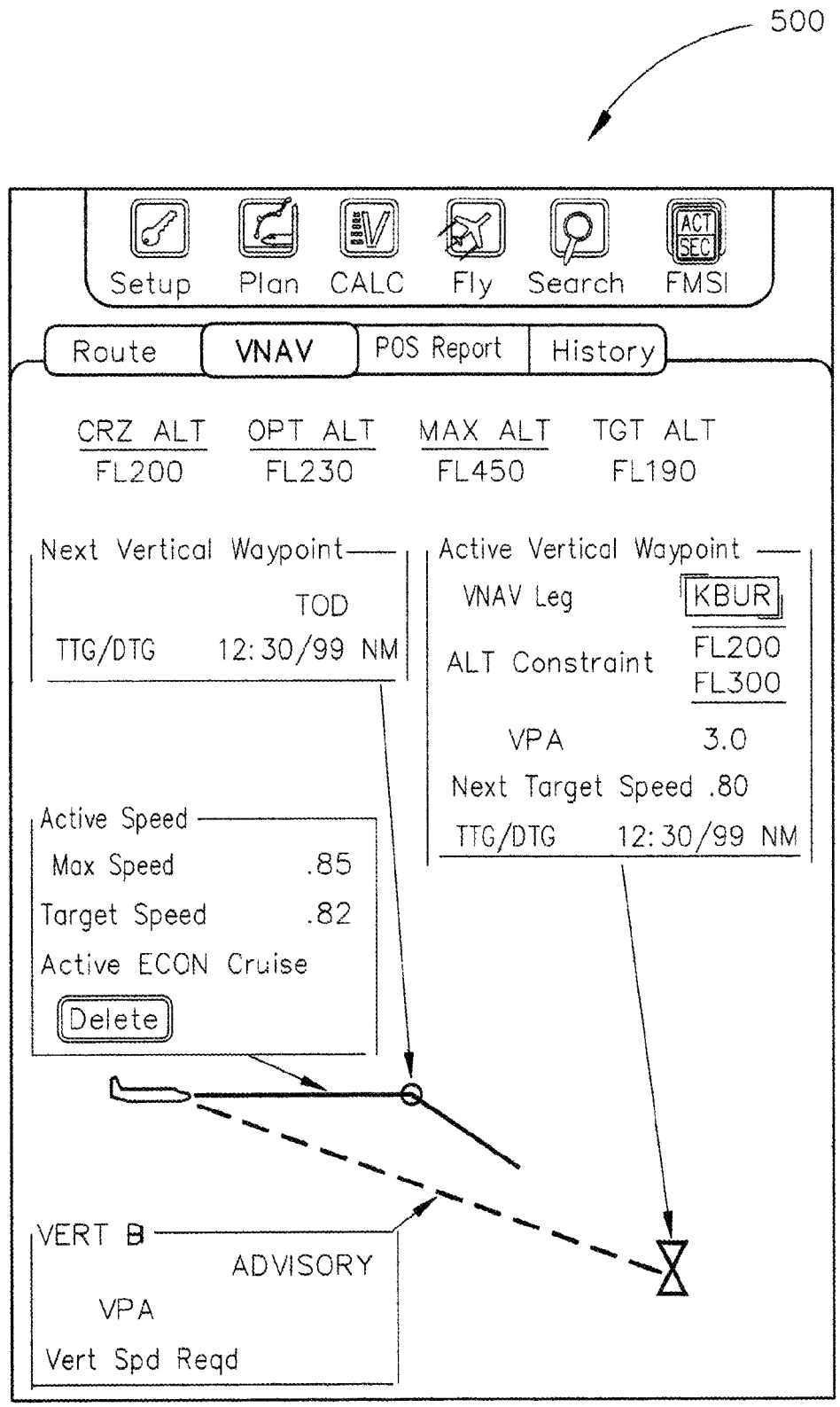
FIG. 5 is an illustration depicting a profile-view schematic of another VNAV leg.

Some other conditions may also trigger the profile-view schematic to provide a warning signal. For example, if it is determined that a discontinuity exists within a VNAV leg, a visual signal as depicted in FIG. 5 may be provided to indicate that such a condition has occurred. Discontinuities may occur due to temporary air restrictions, traffic congestions in certain areas, as well as other conditions that may occur while the aircraft is in flight. Presenting a discontinuity in the manner as depicted in FIG. 5 allows the user to visualize the flight plan and take alternative path when available.

While the examples above describe indicating the next vertical waypoint in the profile-view schematic of each VNAV leg, it is contemplated that applicable active vertical waypoints may also be indicated in the profile-view schematics in addition to the next vertical waypoints. Next vertical waypoints and active vertical waypoints are both data items for describing what the FMS VNAV function is currently trying to fly to. However, an active vertical waypoint is related to VNAV data that has been assigned to a specific lateral waypoint within the flight plan. A next vertical waypoint by comparison is a vertical waypoint that has been created within the Flight Plan based on VNAV legs, i.e. TOC or TOD, but does not have a lateral constraint assigned to it.

For instance, suppose the aircraft is required to climb to the TOC (next vertical waypoint), level off after the initial climb, and proceed to the active vertical waypoint while maintaining the same altitude, then the active vertical waypoint may be depicted in the profile-view schematic as shown in FIG. 1. However, if another TOC or TOD is present between the TOC 102 and the active vertical waypoint 104 (i.e., the aircraft does not maintain the same altitude between TOC 102 and the active vertical waypoint 104), the current VNAV leg may therefore terminate prior to the other TOC or TOD (which would be a part of the next VNAV leg), and the active vertical waypoint 104 would therefore not be depicted in the profile-view schematic of the current VNAV leg. Displaying active vertical waypoints in profile-view schematics when applicable provides additional information to the user and may therefore be appreciated in various situations.

Figure 6:
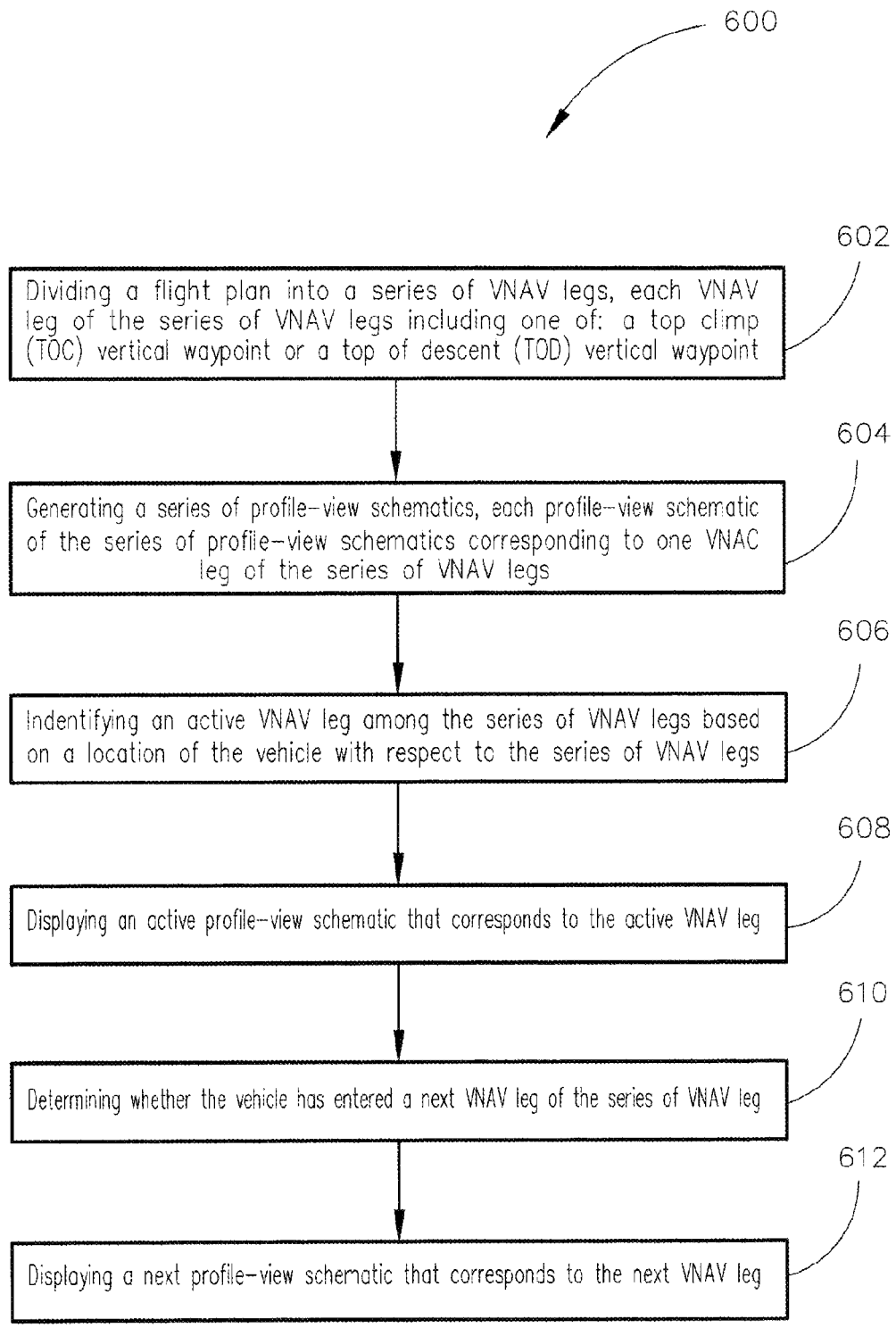
FIG. 6 is a flow diagram depicting a method for presenting VNAV data in accordance with the present disclosure.

Referring to FIG. 6, a flow diagram depicting a method 600 for presenting VNAV data is shown. Step 602 may divide the flight plan into a series of VNAV legs. Each VNAV leg may include one TOC vertical waypoint or one TOD vertical waypoint. Step 604 may generate a series of profile-view schematics as described above. Each profile-view schematic corresponds to one of the series of VNAV legs. Step 606 may identify an active VNAV leg among the series of VNAV legs based on the location of the aircraft with respect to the series of VNAV legs. Step 608 may display the profile-view schematic that corresponds to the active VNAV leg. Subsequently, step 610 may determine whether the vehicle has entered a next VNAV leg of the series of VNAV legs, and step 612 may update and display the next profile-view schematic accordingly.

It is contemplated that the profile-view schematics described above may be generated as a series of static images once the flight plan is received. Alternatively, such images may be generated and/or updated dynamically in certain implementations. For instance, the profile-view schematics may be drawn to scale and the current location of the aircraft may be determined utilizing various positioning systems and displayed along the profile-view schematics as the aircraft travels through the VNAV legs. It is understood, however, whether to utilize the static or the dynamic implementation may be a design choice based on various factors including available resources and the like.

Furthermore, the profile-view schematics in accordance with the present disclosure may also provide the ability for the users to edit/manipulate parameters that affect VNAV restrictions from within the schematic display. For instance, the profile-view schematics may provide certain control buttons (e.g., delete, select, update or the like) that may allow the user to delete/select certain flight paths when needed. It is contemplated that other parameters that may affect VNAV restrictions may also be modified through the profile-view schematics accordingly.

It is also contemplated that the requirement for each VNAV leg to include one TOC vertical waypoint or one TOD vertical waypoint may be relaxed. For example, if the screen is large enough to display more than one climb or descent event at a time, then each VNAV leg may include more than one TOC or TOD waypoint. However, the single TOC/TOD waypoint approach may be preferred in the static image implementation.

It is further contemplated that the method for presenting VNAV data in accordance with the present disclosure may be appreciated in other types of vehicles in addition to aircraft. The vehicle may be any mechanical means of conveyance or transport, which may include, but is not limited to, airborne vehicles, maritime vehicles, land-based vehicles or the like.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A method for presenting vertical navigation (VNAV) data on an aircraft, the method comprising:
    dividing a flight plan into a series of VNAV legs based on vertical waypoints in the flight plan, each VNAV leg of the series of VNAV legs including exactly one of: a top of climb (TOC) vertical waypoint or a top of descent (TOD) vertical waypoint;
    generating a series of profile-view schematics, each profile-view schematic of the series of profile-view schematics corresponding to one VNAV leg of the series of VNAV legs;
    identifying an active VNAV leg among the series of VNAV legs based on a location of the aircraft with respect to the series of VNAV legs; and
    displaying an active profile-view schematic that corresponds to the active VNAV leg.

2. The method of claim 1, wherein each profile-view schematic includes a graphical representation of vertical navigation data of one VNAV leg of the series of VNAV legs.

3. The method of claim 2, wherein each profile-view schematic further includes text descriptions of the vertical navigation data.

4. The method of claim 3, wherein each profile-view schematic further identifies at least one of: a next vertical waypoint or an active vertical waypoint in the active VNAV leg.

5. The method of claim 1, further comprising:
    determining whether the aircraft has climbed past the TOC vertical waypoint in the active VNAV leg; and
    providing a signal to indicate that the aircraft has climbed past the TOC vertical waypoint.

6. The method of claim 1, further comprising:
    determining whether the aircraft has traveled past the TOD vertical waypoint without initiating a descent in the active VNAV leg; and
    providing a signal to indicate that the aircraft has traveled past the TOD vertical waypoint without initiating a descent.

7. The method of claim 1, further comprising:
    determining whether the aircraft has entered a next VNAV leg of the series of VNAV legs; and
    displaying a next profile-view schematic that corresponds to the next VNAV leg.

8. A method for presenting vertical navigation (VNAV) data on a vehicle, the method comprising:
    dividing a planned route into a series of VNAV legs based on vertical waypoints in the planned route, each VNAV leg of the series of VNAV legs including one of: a top of climb (TOC) vertical waypoint or a top of descent (TOD) vertical waypoint;
    generating a series of profile-view schematics, each profile-view schematic of the series of profile-view schematics corresponding to one VNAV leg of the series of VNAV legs;
    identifying an active VNAV leg among the series of VNAV legs based on a location of the vehicle with respect to the series of VNAV legs; and
    displaying an active profile-view schematic that corresponds to the active VNAV leg.

9. The method of claim 8, wherein each profile-view schematic includes a graphical representation of vertical navigation data of one VNAV leg of the series of VNAV legs.

10. The method of claim 9, wherein each profile-view schematic further includes text descriptions of the vertical navigation data.

11. The method of claim 10, wherein each profile-view schematic further identifies at least one of: a next vertical waypoint or an active vertical waypoint in the active VNAV leg.

12. The method of claim 8, further comprising:
determining whether the vehicle has climbed past the TOC vertical waypoint in the active VNAV leg; and
providing a signal to indicate that the vehicle has climbed past the TOC vertical waypoint.

13. The method of claim 8, further comprising:
determining whether the vehicle has traveled past the TOD vertical waypoint without initiating a descent in the active VNAV leg; and
providing a signal to indicate that the vehicle has traveled past the TOD vertical waypoint without initiating a descent.

14. The method of claim 8, further comprising:
determining whether the vehicle has entered a next VNAV leg of the series of VNAV legs; and
displaying a next profile-view schematic that corresponds to the next VNAV leg.

15. The method of claim 8, wherein the vehicle is an aircraft and the planned route is specified in a flight plan.

16. A flight management system configured for presenting vertical navigation (VNAV) data on a vehicle, the flight management system comprising:
a computer processor configured for:
dividing a planned route into a series of VNAV legs based on vertical waypoints in the planned route, each VNAV leg of the series of VNAV legs including one of: a top of climb (TOC) vertical waypoint or a top of descent (TOD) vertical waypoint;
generating a series of profile-view schematics, each profile-view schematic of the series of profile-view schematics corresponding to one VNAV leg of the series of VNAV legs; and
identifying an active VNAV leg among the series of VNAV legs based on a location of the vehicle with respect to the series of VNAV legs; and
a display configured for displaying an active profile-view schematic that corresponds to the active VNAV leg.

17. The flight management system of claim 16, wherein each profile-view schematic includes a graphical representation of vertical navigation data of one VNAV leg of the series of VNAV legs.

18. The flight management system of claim 16, wherein the computer processor is further configured for:
determining whether the vehicle has climbed past the TOC vertical waypoint in the active VNAV leg; and
providing a signal to indicate that the vehicle has climbed past the TOC vertical waypoint.

19. The flight management system of claim 16, wherein the computer processor is further configured for:
determining whether the vehicle has traveled past the TOD vertical waypoint without initiating a descent in the active VNAV leg; and
providing a signal to indicate that the vehicle has traveled past the TOD vertical waypoint without initiating a descent.

20. The flight management system of claim 16, wherein the computer processor is further configured for:
determining whether the vehicle has entered a next VNAV leg of the series of VNAV legs; and
displaying a next profile-view schematic that corresponds to the next VNAV leg.

* * * * *